United States Patent
Barton et al.

(10) Patent No.: US 9,496,775 B2
(45) Date of Patent: Nov. 15, 2016

(54) CONTROLLING END RING BALANCE IN PRE-BALANCING SPINNING PROCESS

(71) Applicant: Tesla Motors, Inc., Palo Alto, CA (US)

(72) Inventors: Augusto E. Barton, Palo Alto, CA (US); Edwin M. Pearce, Jr., San Francisco, CA (US); Shyi-Perng Phillip Luan, Walnut Creek, CA (US)

(73) Assignee: TESLA MOTORS, INC., Palo Alto, CA (US)

( * ) Notice: Subject to any disclaimer, the term of this patent is extended or adjusted under 35 U.S.C. 154(b) by 475 days.

(21) Appl. No.: 13/921,772

(22) Filed: Jun. 19, 2013

(65) Prior Publication Data

US 2014/0375166 A1 Dec. 25, 2014

(51) Int. Cl.
*H02K 1/22* (2006.01)
*H02K 15/16* (2006.01)
*H02K 7/04* (2006.01)
*H02K 17/16* (2006.01)

(52) U.S. Cl.
CPC .............. *H02K 15/165* (2013.01); *H02K 1/22* (2013.01); *H02K 7/04* (2013.01); *H02K 17/165* (2013.01); *Y10T 29/49012* (2015.01)

(58) Field of Classification Search
CPC ........ H02K 1/22; H02K 15/165; H02K 7/04; H02K 17/165; Y10T 29/49004; Y10T 29/49012
USPC ....... 310/216.116, 60 R, 90, 156.22, 156.61, 310/216.117, 400, 406, 407, 411; 29/596, 29/598
IPC ............................................ H02K 1/22, 15/16
See application file for complete search history.

(56) References Cited

U.S. PATENT DOCUMENTS

| | | | | |
|---|---|---|---|---|
| 2,769,934 A | * | 11/1956 | Stone | H02K 5/1672 29/451 |
| 3,861,025 A | * | 1/1975 | Sims | G01N 27/82 29/593 |
| 4,970,424 A | * | 11/1990 | Nakamura | H02K 17/165 310/211 |
| 5,059,844 A | * | 10/1991 | Anstine | 310/90 |

(Continued)

FOREIGN PATENT DOCUMENTS

| | | |
|---|---|---|
| EP | 2006068497 | 5/2007 |
| JP | H06-167288 | 6/1994 |

(Continued)

OTHER PUBLICATIONS

English translation of JP 07023549A, Nakamura, Jan. 1995.*
International Application No. PCT/US2014/039029, International Search Report dated Sep. 11, 2014, 5 pages.
International preliminary report on patentability in application PCT/US2014/039029, Dec. 22, 2015, 7 pages.

*Primary Examiner* — John K Kim
(74) *Attorney, Agent, or Firm* — Garlick & Markison; Bruce E. Garlick

(57) ABSTRACT

A rotor includes: a shaft; a core around the shaft; at least one end ring connected to rotor bars that are at least partially enclosed in the core; and means for balancing the end ring around the shaft in a pre-balancing spinning process. A method includes: assembling rotor bars so that they are at least partially enclosed in a core of a rotor; connecting an end ring to ends of the rotor bars; inserting a shaft into the core; step for balancing the end ring around the shaft in a pre-balancing spinning process that involves spinning the rotor; and spinning the rotor in the pre-balancing spinning process.

18 Claims, 2 Drawing Sheets

(56) References Cited

U.S. PATENT DOCUMENTS

| | | | |
|---|---|---|---|
| 5,140,211 A * | 8/1992 | Ucida | H02K 1/2773 310/156.61 |
| 5,758,404 A * | 6/1998 | Baumann et al. | 29/598 |
| 5,889,342 A * | 3/1999 | Hasebe | H02K 9/19 310/156.19 |
| 7,741,750 B1 | 6/2010 | Tang | |
| 7,791,239 B2 * | 9/2010 | Martin | H02K 1/28 310/156.08 |
| 8,154,167 B2 | 4/2012 | Tang | |
| 2005/0073216 A1 * | 4/2005 | Mitcham | 310/270 |
| 2007/0138889 A1 * | 6/2007 | Maldener | H02K 1/2733 310/156.22 |
| 2008/0272671 A1 | 11/2008 | Waddell et al. | |
| 2011/0062819 A1 | 3/2011 | Lyons et al. | |
| 2014/0375166 A1 * | 12/2014 | Barton | H02K 7/04 310/216.116 |

FOREIGN PATENT DOCUMENTS

| | | |
|---|---|---|
| JP | 07-23549 | 1/1995 |
| JP | 07023549 A * | 1/1995 |
| JP | H10-290556 | 10/1998 |
| JP | 2005-233980 | 8/2005 |

* cited by examiner

CONTROLLING END RING BALANCE IN PRE-BALANCING SPINNING PROCESS

BACKGROUND

Electric motors typically include a rotor mounted on a shaft inside a stator. The rotor can have conducting elements, sometimes called rotor bar, placed along its periphery. The rotor bars can be parallel with the shaft or can be skewed in relation to the shaft. At each end of the rotor an end ring can be connected to the respective ends of the rotor bars, for example as in done in so-called squirrel-cage rotors. The rotor bars and end rings are made from some suitable material, such as copper.

Because rotors will revolve in normal operation, it is important that they be properly balanced before the electric motor can be used. Balancing is sometimes preceded by spinning the rotor at relatively high speed. This puts a high load on the rotor components. For example, spinning at 16,000 rpm can subject the copper rotor bars to a load on the order of 10 kN. Likewise, the end rings, which can also be made of copper, can be subjected to a high centripetal shear, on the order of 181 MPa.

Loads of these magnitudes can affect the rotor balance. For example, the end ring material (e.g., copper) can expand outward due to the load impacted by the spinning. That is, the outer diameter of the end ring can increase due to the intense rotation, making the end ring larger than initially. As another example, the end ring can shift so that it is no longer coaxial with the rotor shaft, causing the rotor to become unbalanced.

It is sometimes attempted to counteract these and other sources of imbalance by selectively removing small amounts of material from the end rings. After such removal, the rotor is again spun at high speed to determine whether the adjustment was sufficient. However, such additional rotation processes can again introduce some amount of imbalance, as discussed above.

SUMMARY

In a first aspect, a rotor comprises: a shaft; a core around the shaft; at least one end ring connected to rotor bars that are at least partially enclosed in the core; and means for balancing the end ring around the shaft in a pre-balancing spinning process.

Implementations can include any or all of the following features. The means for balancing the end ring around the shaft comprises a conical wedge that places a pre-load on the end ring before the spinning process. The means comprises two conical wedges and wherein one of the conical wedges is created by machining the shaft. The rotor further comprises a snap ring that restricts the conical wedge from moving along the shaft. The means for balancing the end ring around the shaft comprises an inner bracket inside the end ring, the inner bracket having an interference fit to the end ring and to the shaft. The inner bracket is annular with a cylindrical inner surface toward the shaft, and a cylindrical outer surface toward the end ring, and an annular groove between the cylindrical inner and outer surfaces. The shaft has a chamfer configured for use in assembling the end ring and the inner bracket onto the shaft. The means for balancing the end ring around the shaft comprises an outer bracket with an interference fit to the shaft, wherein one of the outer bracket and the end ring has a protrusion, and another of the outer bracket and the end ring has a slot corresponding to the protrusion.

In a second aspect, a method comprises: assembling rotor bars so that they are at least partially enclosed in a core of a rotor; connecting an end ring to ends of the rotor bars; inserting a shaft into the core; step for balancing the end ring around the shaft in a pre-balancing spinning process that involves spinning the rotor; and spinning the rotor in the pre-balancing spinning process.

Implementations can include any or all of the following features. The shaft is inserted into the core before the end ring is connected to the ends of the rotor bars. The step for balancing the end ring around the shaft comprises assembling a conical wedge onto the shaft before the pre-balancing spinning process, the conical wedge placing a pre-load on the end ring. The method further comprises machining the shaft to create the conical wedge. The step for balancing the end ring around the shaft comprises assembling an inner bracket inside the end ring, the inner bracket having an interference fit to the end ring and to the shaft. The inner bracket is annular with a cylindrical inner surface toward the shaft, and a cylindrical outer surface toward the end ring, and an annular groove between the cylindrical inner and outer surfaces. The method further comprises using a chamfer on the shaft in assembling the end ring and the inner bracket onto the shaft. The step for balancing the end ring around the shaft comprises assembling an outer bracket onto the shaft with an interference fit, wherein one of the outer bracket and the end ring has a protrusion, and another of the outer bracket and the end ring has a slot corresponding to the protrusion. The method further comprises determining, after the pre-balancing spinning process, whether the rotor is imbalanced, and, if so, balancing the rotor by adding or removing material on the end ring.

DETAILED DESCRIPTION

This document describes systems and techniques for keeping an end ring balanced around a shaft of a rotor during a spinning process that precedes a conventional balancing procedure. A balancing procedure typically involves adding or removing material on an end ring of a rotor, the material added/removed in a rotationally asymmetrical location so as to compensate for rotor imbalance. Before such balancing, a high-speed spinning process can be performed to put centripetal load on the end ring and expand it into a stretched condition. The technology described herein can keep the end ring balanced around the shaft of the rotor during such pre-balancing spinning process.

In some implementations, one or more mechanical features are used to place a pre-load stress on the end ring before the rotor is balanced. For example, a conical wedge or an inner bracket can be used. In some implementations, one or more mechanical features are used to restrict radial movement or expansion by the end ring, and thereby control the end ring balance with respect to the shaft.

Figure 1:
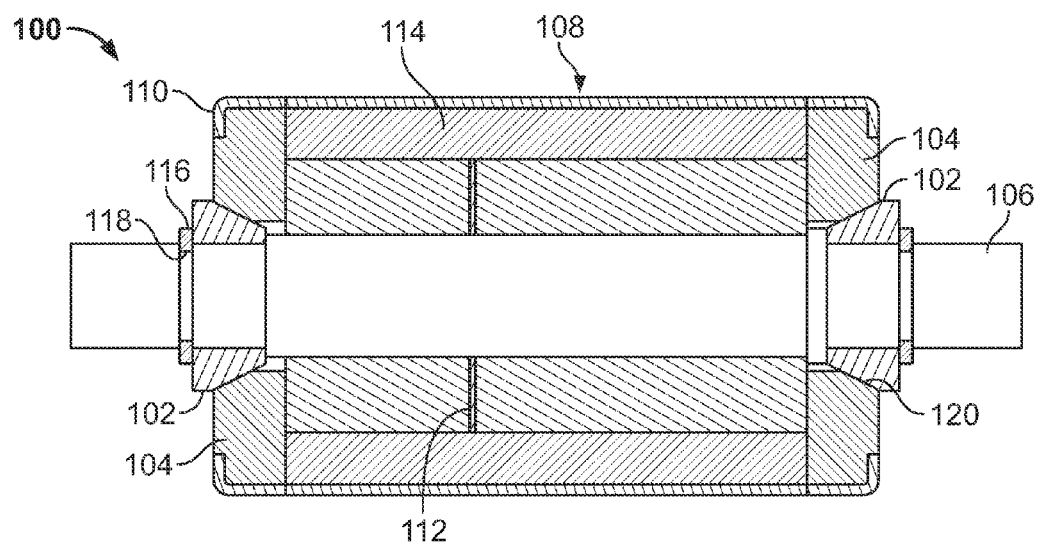
FIG. 1 shows an example cross section of a rotor wherein a conical wedge places a pre-load on an end ring.

FIG. 1 shows an example cross section of a rotor 100 wherein a conical wedge 102 places a pre-load on an end ring 104. The rotor has a shaft 106 and a core 108. The core and the end rings surround the shaft. The core can have one or more containment rings 110 on the end rings.

The core 108 can be made from a single piece of material or it can be made up of laminations 112 (one of which is shown here, for clarity) that are assembled into a stack.

The components of the rotor 100 can be assembled using any suitable technique. Rotor bars 114 (e.g., from copper) that are fully or partially enclosed in the core 108 can be brazed or e-beam welded to the end ring(s) 104, to name just two examples.

In assembly, the conical wedges 102 can be pressed from each side until the cone/ring is in place. For example, the pressing can be done until a snap ring 116 fits inside a groove 118. The conical wedges can be pressed into an inner diameter of the end rings 104 (e.g., from copper) and thereby increase the end ring diameter to a stress state equivalent to, or close to, that which the rotor is subjected to in high speed rotation (e.g., during rotor balancing). Accordingly, the end ring can yield and expand to a larger diameter. In some implementations, the stress level is tuned by normal practices in press fit design. The pressing can provide an end ring diameter that is more stable at different operating speeds. The end ring can be provided with a sloping surface 120 that corresponds to the angle of the conical wedge.

Also, as a result of the pressing the rotor bars 114 (e.g., from copper) can move radially outward—toward an outer diameter of the rotor—which can serve to fully or partially close a gap between the bars and bar slots in the laminations 112. For example, this can reduce any uncertainty in the position of the rotor bars, which can also serve to reduce balance instability in the rotor.

In some implementations, one of the conical wedges 102 can be part of the shaft 106. For example, the wedge can be machined into the shaft in the manufacturing process.

In some implementations, a solution other than the snap rings can be used for retaining the wedge(s), for example a clamp or a weld joint.

Figure 2:
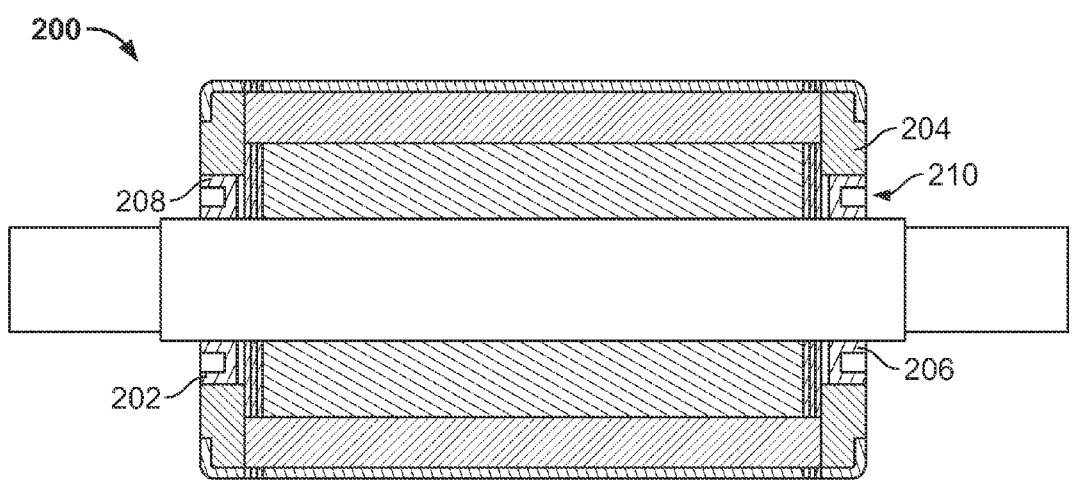
FIG. 2 shows an example cross section of a rotor with an inner bracket inside an end ring.

FIG. 2 shows an example cross section of a rotor 200 with an inner bracket 202 inside an end ring 204. Other than these components, the rotor 200 can be similar or identical to the rotor described above with reference to FIG. 1.

Generally, the inner bracket 202 has an interference fit to both an inner diameter of the end ring 204, and to the shaft. For example, the inner bracket can be annular and have a cylindrical inner surface 206 toward the shaft, and a cylindrical outer surface 208 toward the end ring. In some implementations, the inner bracket has an annular groove 210 between the cylindrical inner and outer surfaces. The inner bracket can be designed and manufactured with a shape and material so that it essentially withstands the rotational loads of the balancing and operation of the rotor. Suitable materials could be stainless steel, aluminum, or steel, to name just a few examples. The inner bracket can be manufactured using any suitable technique, including, but not limited to, forming, casting and/or machining.

In some implementations, the following assembly process can be performed. The bracket is pressed onto the inner diameter of the end ring. Next, the inner diameter of the ring/bracket assembly is aligned with the inner diameter of the core (e.g., of the laminates that make up the core). The end ring can then be attached (e.g., by welding) to the rotor bars, wherein the alignment of the inner diameters ensures that the shaft can thereafter be assembled through both inner diameters.

In some implementations, another assembly process can be performed. The shaft can first be assembled into the inner diameter of the core, and the end ring and bracket can then be pressed onto the shaft. The ring/bracket assembly can be rotated as needed to line up with the ends of the rotor bars. For example, this can be done using an assembly fixture or alignment features on the end ring flange and shaft, as well as having the shaft rotationally aligned to the stack. The end ring can then be attached (e.g., by welding) to the rotor bars.

In some implementations, another assembly process can be performed. The end ring can first be attached (e.g., by welding) to the rotor bars. Then the shaft can be assembled into the inner diameter of the core, and the bracket can then be pressed onto the shaft.

Figure 3:
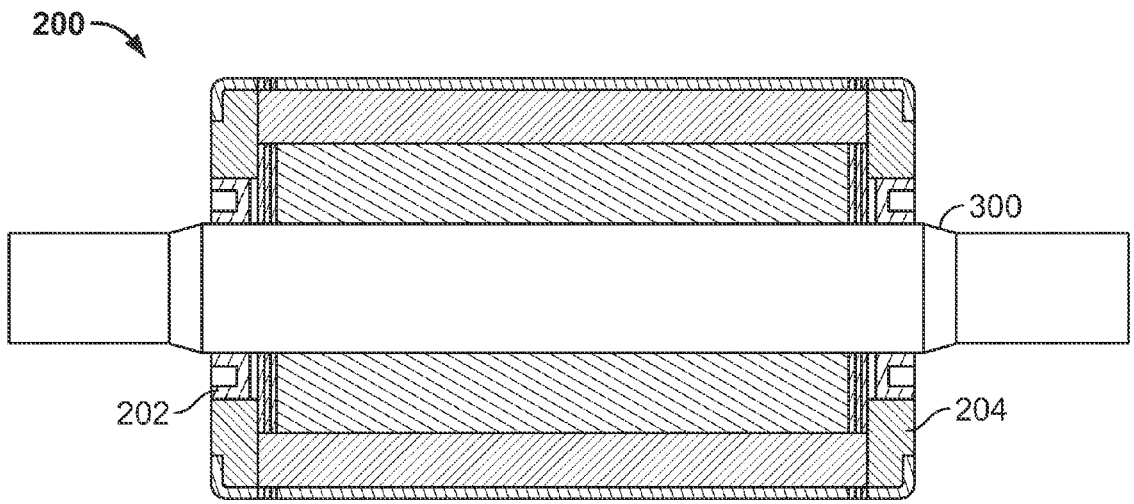
FIG. 3 shows another example cross section of the rotor of FIG. 2 wherein the shaft has a chamfer.

FIG. 3 shows another example cross section of the rotor 200 of FIG. 2 wherein the shaft has a chamfer 300. For example, the chamfer can be used in assembling the end ring 204 and the inner bracket 202 onto the shaft. The chamfer can be formed in the process of manufacturing the shaft, such as by machining or casting.

Figure 4:
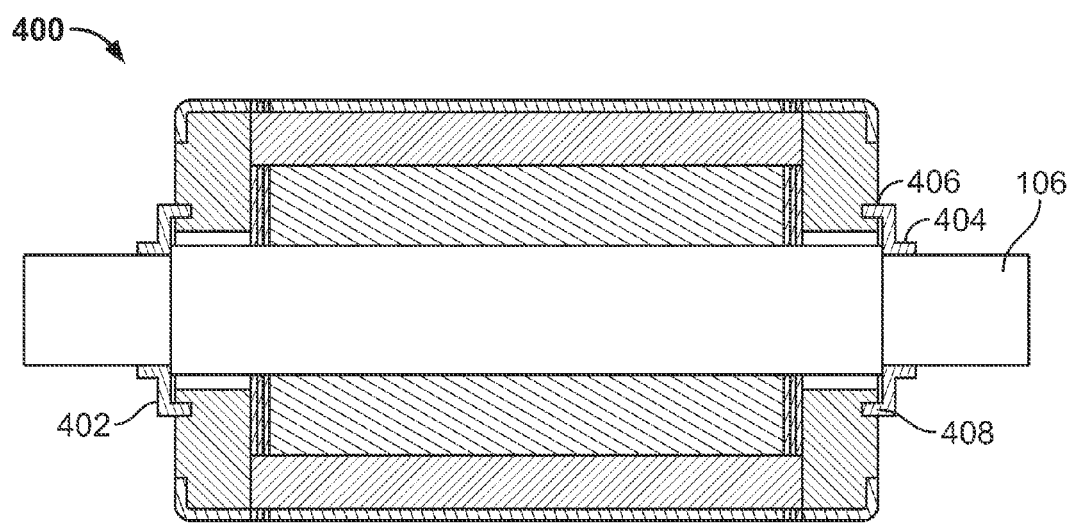
FIG. 4 shows an example cross section of a rotor with an outer bracket having an interference fit to the shaft.

FIG. 4 shows an example cross section of a rotor 400 with an outer bracket 402 having an interference fit to the shaft 106. Other than these components, the rotor 400 can be similar or identical to the rotor described above with reference to FIG. 1.

The bracket has a base portion 404 that provides the interference fit to the shaft 106. Portion 408 could be facing in the axially outward or inward direction; FIG. 4 depicts the axially outward implementation. In some implementations, the base portion has an inward facing surface that is curved to essentially match the shaft surface. For example, the base portion can be essentially annular.

One of the outer bracket 402 and the end ring has a protrusion 406 that meets with a slot 408 in the other of the outer bracket and the end ring. Here, the protrusion is on the outer bracket and the slot is on the end ring. For example, the protrusion can be an essentially annular flange and the slot can be an essentially annular groove.

The outer bracket 402 does not constrain the end ring while the end ring is being assembled to the rotor bars (e.g., by brazing or e-beam welding) because the outer bracket has not been mounted at that point in time. Rather, the outer bracket is installed after the shaft is inserted.

After the outer bracket 402 has been assembled onto the shaft (e.g., by pressing), the rotor will be spun at high rpm to let the end ring (e.g., from copper) grow by the centripetal load. For example, there may initially be a gap between the protrusion 406 and the slot 408 in a radially inward position, and upon growth of the end ring, this gap can be bridged until the protrusion contacts the edge of the slot and the outer bracket restricts further growth of the end ring. The end ring position may thereby be fixed to the shaft. In some implementations, a snap ring (see, e.g., the snap ring 116 in FIG. 1) can be provided outside either or both outer brackets.

As another example, the protrusion 406 from bracket 402 can be the result of a forming operation in which it takes the shape of slot 408 while, or after, it is pressed onto the shaft 106. After that the rotor can be spun at high rpm to let the end ring (e.g., from copper) grow by the centripetal load. For example, there may initially be a gap between the protrusion 406 and the slot 408 in a radially inward position, and upon growth of the end ring, this gap can be bridged until the protrusion contacts the edge of the slot and the outer bracket restricts further growth of the end ring.

The press fit of the outer bracket is such that the press is maintained in all operating conditions. The outer bracket can be manufactured from any material suitable to withstand the loads of high-rpm rotation (e.g., in the rotor balancing process) and to balance the end ring around the shaft.

A number of implementations have been described as examples. Nevertheless, other implementations are covered by the following claims.

What is claimed is:

1. A method comprising:
   assembling rotor bars so that they are at least partially enclosed in a core of a rotor;
   connecting an end ring to ends of the rotor bars;
   inserting a shaft into the core;
   balancing the end ring around the shaft in a pre-balancing spinning process that involves spinning the rotor by assembling a conical wedge onto the shaft before the pre-balancing spinning process, the conical wedge placing a pre-load on the end ring; and
   spinning the rotor in the pre-balancing spinning process.

2. The method of claim 1, wherein the shaft is inserted into the core before the end ring is connected to the ends of the rotor bars.

3. The method of claim 1 further comprising machining the shaft to create the conical wedge.

4. The method of claim 1, wherein balancing the end ring around the shaft comprises assembling an inner bracket inside the end ring, the inner bracket having an interference fit to the end ring and to the shaft.

5. The method of claim 4, wherein the inner bracket is annular with a cylindrical inner surface toward the shaft, and a cylindrical outer surface toward the end ring, and an annular groove between the cylindrical inner and outer surfaces.

6. The method of claim 5, further comprising using a chamfer on the shaft in assembling the end ring and the inner bracket onto the shaft.

7. The method of claim 1, further comprising assembling the rotor into a stator to form an electric motor.

8. The method of claim 1, further comprising balancing the rotor.

9. A method comprising:
   assembling rotor bars so that they are at least partially enclosed in a core of a rotor;
   connecting an end ring to ends of the rotor bars;
   inserting a shaft into the core; and
   balancing the end ring around the shaft in a pre-balancing spinning process that includes:
      assembling an outer bracket onto the shaft with an interference fit, wherein one of the outer bracket and the end ring has a protrusion, and another of the outer bracket and the end ring has a slot corresponding to the protrusion; and
      spinning the rotor.

10. The method of claim 1, further comprising determining, after the pre-balancing spinning process, whether the rotor is imbalanced, and, if so, balancing the rotor by adding or removing material on the end ring.

11. The method of claim 9, wherein the shaft is inserted into the core before the end ring is connected to the ends of the rotor bars.

12. The method of claim 9, further comprising machining the shaft to create a conical wedge.

13. The method of claim 9, wherein the step of balancing the end ring around the shaft in the pre-balancing spinning process comprises assembling an inner bracket inside the end ring, the inner bracket having an interference fit to the end ring and to the shaft.

14. The method of claim 13, wherein the inner bracket is annular with a cylindrical inner surface toward the shaft, and a cylindrical outer surface toward the end ring, and an annular groove between the cylindrical inner and outer surfaces.

15. The method of claim 14, further comprising using a chamfer on the shaft in assembling the end ring and the inner bracket onto the shaft.

16. The method of claim 9, further comprising determining, after the pre-balancing spinning process, whether the rotor is imbalanced, and, if so, balancing the rotor by adding or removing material on the end ring.

17. The method of claim 9, further comprising assembling the rotor into a stator to form an electric motor.

18. The method of claim 9, further comprising further comprising balancing the rotor.

* * * * *